Sept. 26, 1967 E. A. GERE ET AL 3,344,263
ANALOG DIVIDING CIRCUIT WITH A DUAL EMITTER
TRANSISTOR USED AS A RATIO DETECTOR
Filed Feb. 24, 1964 2 Sheets-Sheet 1

INVENTORS E. A. GERE
G. L. MILLER
BY R. O. Nimtz
ATTORNEY

United States Patent Office 3,344,263

Patented Sept. 26, 1967

3,344,263

ANALOG DIVIDING CIRCUIT WITH A DUAL EMITTER TRANSISTOR USED AS A RATIO DETECTOR

Edward A. Gere, New Market, and Gabriel L. Miller, Westfield, N.J., assignors to Bell Telephone Laboratories, Incorporated, New York, N.Y., a corporation of New York Filed Feb. 24, 1964, Ser. No. 346,937
8 Claims. (Cl. 235—196)

ABSTRACT OF THE DISCLOSURE

A circuit for performing analog division that uses a dual emitter transistor as a ratio detector is disclosed. A signal proportional to the peak voltage of the divisor ($I_B$) is applied to the base of the transistor causing a base-to-collector current flow. The emitter-to-emitter impedance of the transistor varies in a linear inverse manner with the base-to-collector current. While this current is flowing, a signal proportional to the dividend ($I_A$) is applied to the emitter circuit causing current to flow through the variable emitter-to-emitter impedance. This results in a voltage drop across the emitter circuit proportional to the quotient $I_A/I_B$.

This invention relates to analog signal processing circuits and, more particularly, to improved circuits for obtaining the ratio of two electrical quantities.

Several techniques have been heretofore proposed to derive the ratio of two electrically represented magnitudes. A first method utilizes the logarithmic characteristic of diodes. Very finely balanced circuits are required for this technique, however, and the circuit operates only for a very restricted range of ratios as well as being very temperature sensitive. One such arrangement is shown in L. Martin Patent 2,244,369, granted June 3, 1941.

A second method relies on the fact that the time to discharge a capacitor is proportional to the ratio of the charge on the capacitor and the magnitude of the discharge current. This technique, of course, produces the solution only after a variable delay, and also requires somewhat elaborate circuitry. One such arrangement is shown in G. C. Randolph et al. Patent 2,934,274, granted April 26, 1960.

A third method which has been utilized to divide two electrically represented quantities relies on the reciprocal relationship between the impedance of a forward biased diode and the current flowing therethrough. One such arrangement is shown in R. Gittleman Patent 3,030,022 granted April 17, 1962. This technique has the disadvantage of being useful for only very small ranges of signal values and, moreover, requiring elaborate circuitry for its implementation.

It is an object of the present invention to improve the speed, reliability and useful range of operation of circuits for deriving the ratio of two electrical quantities.

It is another object of the invention to divide two electrical quantities in a very stable manner with extremely simple reliable circuitry.

It is a more specific object of the invention to perform analog division by means of a simple, self-balancing semiconductor circuit.

In accordance with a preferred embodiment of the present invention, the ratio of two electrical magnitudes is derived by means of a semiconductor device comprising two emitter regions separated by junctions from a common base region which, in turn, is separated by a junction from a common collector region. Such a device is shown, for example, in FIG. 11 of W. Shockley Patent 2,891,171, granted June 16, 1959. In operation, a current proportional to the magnitude of the divisor is caused to flow between the base and collector electrodes. A current proportional to the dividend is caused to flow between the two emitters. Under these conditions, the voltage between the two emitters is proportional to the ratio of the two currents for large ranges of input values and to a high degree of accuracy.

Devices of the type described above have heretofore been used as electronic switches or "choppers" in direct current voltage converters. In this application, the dual emitter transistor structure is alternately cut off and saturated by forward and reverse biasing the base-collector path, and is never biased into its linear range of operation.

In a structure such as the dual emitter transistor, the base-collector current and the emitter-to-emitter conductance are linearly related. This can easily be seen when it is recalled that the conductance between the two emitters is directly proportional to the density of current carriers made available in the base region. These carriers, of course, are made available by injection into the base region. The two emitters are isolated for direct currents to insure this relationship.

Further advantages lie in the cancellation of contact potentials across the two emitter contacts and good thermal tracking.

These and other objects and features, the nature of the present invention and its various advantages, will be more readily understood upon consideration of the attached drawings and the following detailed description of the drawings.

Figure 1:
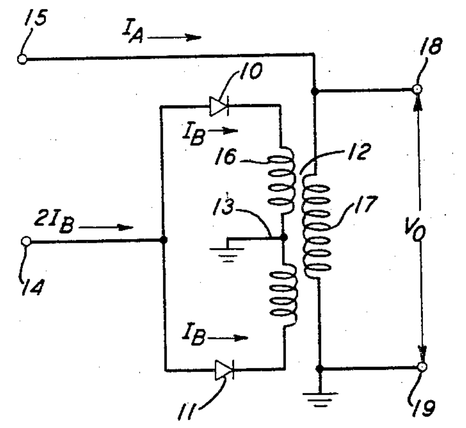
FIG. 1 is a simplified schematic diagram of a balance diode ratio detecting circuit in accordance with the present invention and illustrating the reciprocal relationship of diode current and impedance.

Referring more particularly to FIG. 1, there is shown a simplified circuit diagram of one form of a ratio detecting circuit in accordance with the present invention. This circuit comprises a pair of semiconductor junction diodes 10 and 11 connected in a bridge circuit across the secondary winding 16 of a bifilar, center-tapped transformer 12. Transformer 12 has a winding ratio of 1:1, and the center tap 13 of transformer 12 is connected to ground potential. A current ($2I_B$), proportional to twice the divisor, is applied at terminal 14 to the midpoint between back-to-back connected diodes 10 and 11. A current $I_A$ proportional to the dividend is applied at terminal 15 to the primary winding 17 of transformer 12. The voltage $V_0$ appearing across primary winding 17 of transformer 12, at terminals 18 and 19, is then approximately proportional to the quotient of the dividend and the divisor, i.e., proportional to the ratio of the two currents.

Diodes 10 and 11 are of the type in which the conductance in the forward conducting direction is linearly proportional to the current flowing therethrough for some substantial range of current. While all junction diodes have this property for small ranges of currents, better results can be had by selecting diodes for this particular property. In addition, the diodes must be selected for matched characteristics to insure equal division of the current $2I_B$. The two halves of the secondary winding 16 of transformer 12, of course, must also be fabricated to provide exact balance.

Assuming a unity winding ratio for transformer 12, it can be seen that the impedance looking into the primary winding 17 of transformer 12 is the impedance of diodes 10 and 11 in series. This impedance, of course, is inversely proportional to the current $I_B$.

If a small current $I_A$ from terminal 15 flows through primary winding 17, the voltage $V_0$ is proportional to the ratio of the two currents. More specifically, the impedance Z of each diode is given by $$Z=\frac{kT}{qI_T} \qquad (1)$$

where $I_T$ is the current flowing through the diode, $k$ is Boltzmann's constant, T is the temperature in degrees Kelvin, and $q$ is the charge on the electron. The output voltage $V_0$ is then given by $$V_0=I_A\left(\frac{kT}{q(I_B-I_A)}+\frac{kT}{q(I_B+I_A)}\right) \qquad (2)$$

If temperature is constant and $I_A$ is very small compared to $I_B$, $$V_0\sim C_1\frac{I_A}{I_B} \qquad (3)$$

where $C_1$ is a constant.

It will be noted that the accuracy of the resulting ratio depends directly on balancing the diode currents. This requirement of matched diode characteristics is one of the major disadvantages of this form of ratio detecting circuit. Another disadvantage is the narrow restriction on the ratio $I_A/I_B$.

Figure 2:
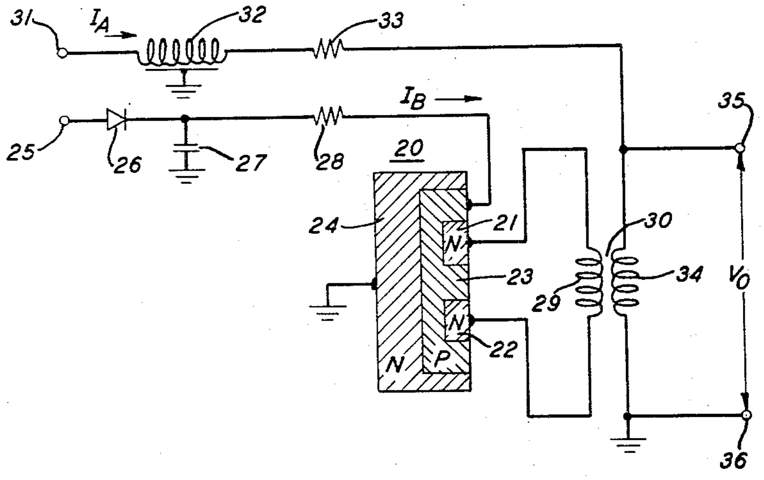
FIG. 2 is a simplified schematic diagram of a preferred ratio form of detecting circuit in accordance with the present invention and using a dual-emitter transistor.

Referring now to FIG. 2, there is shown a preferred embodiment of a ratio detecting circuit in accordance with the present invention comprising a semiconductor body 20 having two small emitter regions 21 and 22, which may, for example, be of n-type conductivity semiconductor material, embedded in a thin region 23 of opposite p-type conductivity material. Region 23, in turn, is embedded in a region 24 of the first or n-type conductivity material. It is clear that the conductivity types could be inverted and all polarities reversed and the circuit would operate as before.

It is apparent that the semiconductor body 20 comprises a transistor in which region 24 may be considered a collector, region 23 a base, and regions 21 and 22 can be regarded as dual, symmetrical emitters. This structure is therefore known as a dual-emitter transistor. In operation, however, the junction between regions 23 and 24 is forward biased, and hence region 24 may also be considered as a third emitter.

As can be seen in FIG. 2, a voltage appearing at input terminal 25 is applied to a peak detector comprising diode 26 and capacitor 27. The peak voltage on capacitor 27 causes a current proportional thereto to flow through resistor 28 and thence across the base-collector junction between regions 23 and 24 of dual-emitter transistor 20. Resistor 28 has a sufficiently high value to make it appear as a constant current source to transistor 20.

The two emitter regions 21 and 22 are connected to the ends of the secondary winding 29 of a transformer 30. A current applied to input terminal 31 flows through a small delay line 32, a large resistor 33 and the primary winding 34 of transformer 30. The voltage $V_0$, appearing across winding 34 at terminals 35 and 36, is proportional to the ratio of the two signals applied to terminals 25 and 31 to a very high degree of accuracy and over substantial ranges of values.

It can be seen that a voltage waveform applied to terminal 25 has its peak detected by the detector comprising diode 26 and capacitor 27. This voltage peak provides a current through resistor 28 to inject current carriers into the base region 23. Since emitters 21 and 22 are isolated for direct currents from the balance of the circuit, the current carriers for conduction between the two emitters must be supplied by this injection into the base region. The emitter-to-emitter impedance, therefore, is directly dependent upon the reciprocal of the base current, and can be shown to be $$Z=\frac{kT}{q}\left(\frac{1-\alpha'}{\alpha}\right)\frac{1}{I_B} \qquad (4)$$

where $\alpha$ is the current gain of each of the n-p-n structures formed by the common collector 24 and emitters 21 and 22, $\alpha'$ is the current gain of the n-p-n structure formed between the two emitters 21 and 22, and the remaining terms are as defined with respect to Equation 2.

When the current $I_A$ is caused to flow through the impedance of Equation 4, the output voltage is given by $$V_o=\frac{kT}{q}\left(\frac{1-\alpha'}{\alpha}\right)\frac{I_A}{I_B} \qquad (5)$$

assuming that the transistor structure is ideal and has no series body or spreading resistance.

The ratio detecting circuit of FIG. 2 has numerous advantages over that of FIG. 1. In the first place, $I_A$ may be a considerable fraction of $I_B$. Moreover, balancing is not required since the current $I_B$ does not flow across the two emitter junctions, but only across the single collector junction. In addition, the integral structure makes for greater reliability and ruggedness as well as accurate contact potential cancellation and thermal tracking.

Devices of the type represented by reference numeral 20 in FIG. 2 are well known and have been used in direct current converters as "choppers" (e.g., National Semiconductor type 3N64). In this application, the base-collector junction (between regions 23 and 24 in FIG. 2) is alternatively heavily forward and reverse biased to obtain maximum impedance change between the dual emitters. In these applications, the emitter-emitter path constitutes an electronic switch and no use is made of the linear relationship between the base-collector current and the emitter-to-emitter conductance. When used in a ratio detecting circuit such as that shown in FIG. 2, these dual emitter transistors perform analog division accurately (within one or two percent) in less than one microsecond and with good temperature stability, i.e., a temperature coefficient of less than 0.1 percent per degree centigrade for the 3N64. Even further improvements can be had by using an epitaxial structure for the base-collector junction, and by interdigitating the two emitters as shown in FIG. 3.

Figure 3:
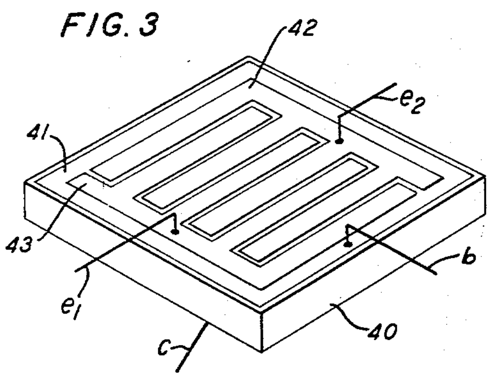
FIG. 3 is a perspective graphic view of a preferred dual-emitter transistor structure for use in the ratio detectors of the present invention.

In FIG. 3 there is shown a perspective view of a preferred form of dual-emitter transistor useful in ratio detecting circuits of the present invention. A semiconductor body 40 has a base region 41 epitaxially formed thereon by diffusion techniques, for example. This base region is made as thin as possible to reduce the charge redistribution time in the base region. This time is the limiting factor in increasing the large signal response time of the divider. Likewise, the interdigitated emitter structure 42 and 43 provide a maximum junction area and hence reduce the ohmic body and device spreading resistance. These improvements would provide higher speed of operation and larger dynamic range.

It is to be noted that since both $\alpha$ and $\alpha'$ are temperature dependent, the entire temperature coefficient of the device can therefore be predicted from Equation 4. By proper selection of $\alpha$ and $\alpha'$, it is possible to obtain a zero temperature coefficient divider. Under this condition, the term $$\left(\frac{1-\alpha'}{\alpha}\right)$$

varies inversely with temperature T and no temperature dependence remains.

Figure 4:
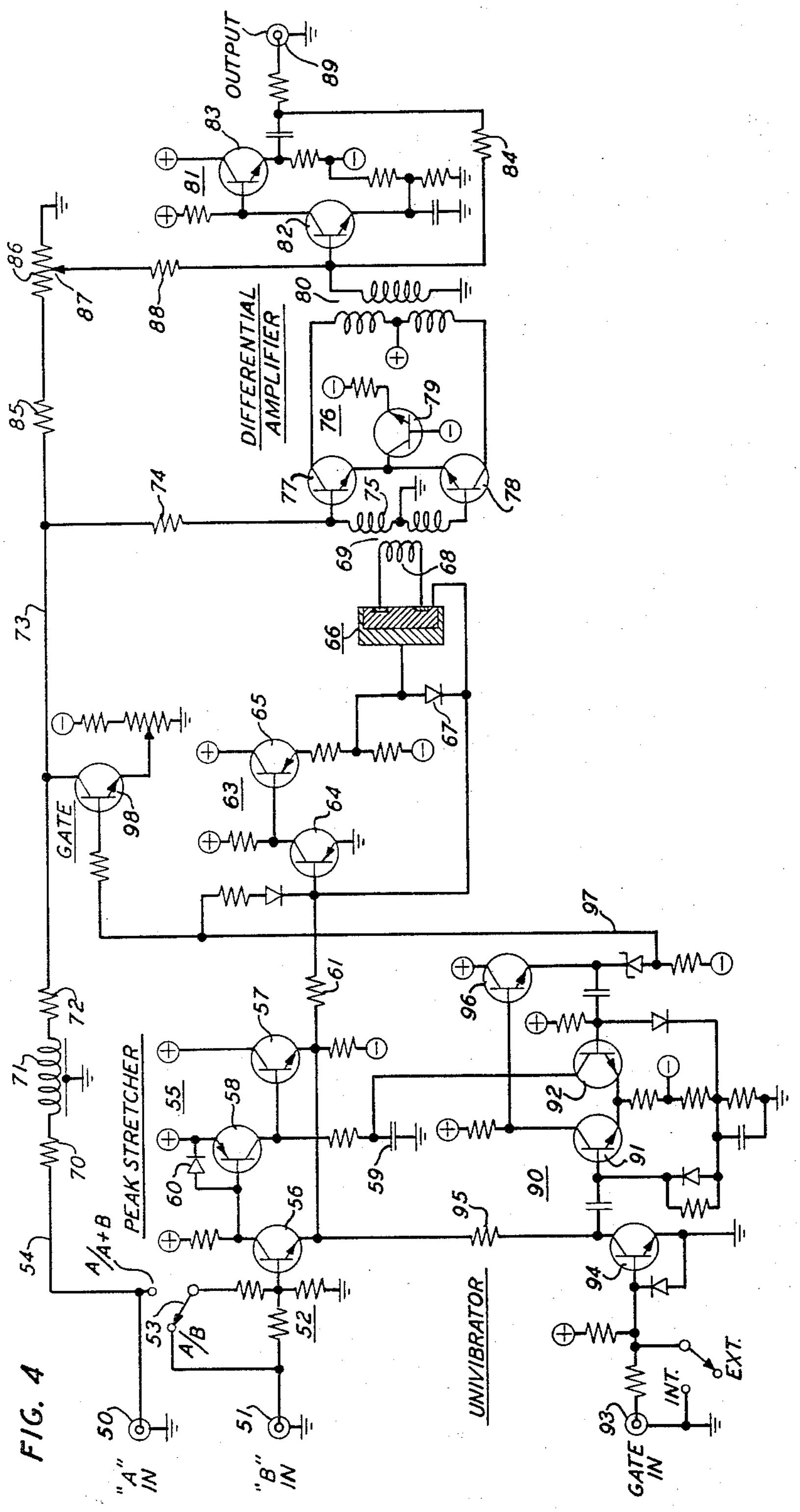
FIG. 4 is a detailed schematic diagram of an analog ratio detecting circuit in accordance with the present invention.

In certain nuclear physics experiments dealing with fission products, it has been found desirable to obtain rapid calculations of ratios in order to separate useful events from a large number of superimposed but useless events. The divider in accordance with the present invention is particularly suitable for this purpose. For such applications, it may be desirable to obtain the ratio of energies, masses, et cetera. Moreover, these quantities are often important only in their peak magnitudes. It is therefore appropriate to detect the peak of one of the inputs and sustain that peak for comparison with the other input. Such an arrangement is shown in FIG. 4. It is to be understood, of course, that the particulars of such an arrangement are most useful for the specific application described, but are by no means essential to the operation of the divider. Real time ratio detection with fraction of a microsecond time lag is possible with the present invention for all signal inputs.

Referring more particularly to FIG. 4, there is shown a detailed circuit diagram of a ratio detecting circuit in accordance with the present invention. The circuit of FIG. 4 includes A input terminals 50 and B input terminals 51. Signals appearing at B input terminals 51 are applied to one leg of resistive summing network 52. Signals appearing at A input terminals 50 can likewise be applied to resistive summing network 52 by way of switch 53 and, in any event, are also applied to A input bus 54.

The sum of the signals applied to resistive summing network 52 provides the input to a peak detecting and stretching circuit 55 comprising transistors 56, 57, and 58. In the presence of a B input signal, capacitor 59 stores a voltage which is proportional to the divisor B. Diode 60 protects transistor 58 from reverse base-emitter breakdown.

The voltage on capacitor 59 is applied to transistor 57, connected as an emitter follower, and thus a current proportional to the peak value of the B input signal is delivered through resistor 61. This current is applied to a two-stage amplifier 63 including transistors 64 and 65 and having a feedback circuit including the base-collector path of dual-emitter transistor 66. The diode 67 is provided across this base-collector path of transistor 66 to protect it from voltage reversals. The feedback arrangement isolates the low impedance interelectrode paths of transistor 66 from the balance of the circuit and thus improves circuit stability and range while maintaining proper impedance levels.

As can be seen, the current delivered to the base-collector path of dual-emitter transistor 66 is proportional to the peak magnitude of the B input signal applied to terminal 51. As discussed with respect to FIG. 2, the inter-emitter impedance of transistor 66 is in inverse proportion to this current. The secondary winding 68 of transformer 69 permits a small current proportional to the A input signal to be applied to this inter-emitter path.

The A input signal applied to input terminal 50 is applied to resistor 70 by way of bus 54 hence to delay line 71 and resistor 72 to bus 73. The signal on bus 73 comprises a current proportional to the A input signal and is applied via resistor 74 to the primary winding 75 of transformer 69. This signal induces an equal current flow in secondary winding 68 to sense the inter-emitter impedance of transistor 66.

This emitter-to-emitter impedance of transistor 66 is detected as a voltage by differential amplifier 76. Differential amplifier 76 comprises a pair of transistors 77 and 78 having their base electrodes connected to respective ends of primary winding 75 and having their emitters tied together and supplied from a constant current source including transistor 79. It can be seen that the constant current applied to transistor 79 to the emitters of transistors 77 and 78 biases them into their linear range of operation and yet provides no net output at transformer 80 due to the balancing effect in the differential circuit. A current supplied through resistor 74, however, unbalances this condition and produces a voltage at output transformer 80 proportional to the voltage across primary winding 75 of transformer 69.

The signal from output transformer 80 is applied to a two-stage feedback amplifier 81 comprising transistors 82 and 83 and including resistive feedback element 84.

The current on bus 73 is also applied to resistor 85 and potentiometer 86. A portion of the voltage across potentiometer 86 is taken off by variable tap 87 and applied via resistor 88 to the input of amplifier 81. This signal is selected to exactly compensate for the effect of any ohmic body and device spreading resistance of transistor 66. The output appearing at the output terminal 89 is therefore directly proportional to the ratio of the A input signal and the B input signal, applied to the input terminals 50 and 51, respectively.

Since the ratio formed by the circuit of FIG. 4 utilizes the peak value of one of the inputs, it is necessary to delay the other input by means of delay circuit 71 until it is certain that such a peak has been reached. In addition, the dual-emitter transistor 66 requires a certain amount of time for the carrier distribution to settle down prior to the application of the A input signal. Delay line 71 meets both of these requirements.

In order to make repetitive measurements of varying ratios, it is also necessary to discharge capacitor 59 rapidly after a particular ratio has been measured. To this end, a univibrator circuit 90 is provided including transistors 92, 96 and 96. The univibrator 90, when triggered by signals from emitter follower 57 by way of resistor 95, trips to its unstable state in which transistor 91 is turned on and transistor 92 is turned off. Under this condition, transistor 96 removes a gate voltage on lead 97. This gate voltage had been applied to gating transistor 98 to hold bus 73 at zero voltage level. It was also applied to the input of amplifier 63 to maintain a large normal current through the base collector path of transistor 66. The circuit of FIG. 4 is not, prior to the removal of the gating voltage on lead 77, responsive to the input signals.

Upon removal of this gating voltage, however, the circuit is able to derive the ratio of the two input signals. Later, when the univibrator 90 reflexes, transistor 92 reoperates to discharge capacitor 59 at constant current. Following a very brief discharge period, the current is restored to normal and can be used to sense the next ratio upon the application of new input signals to inputs 50 and 51.

The circuits shown in detail in FIG. 4 are particularly useful for the measurements of the hereinbefore described quantities in nuclear physics. The same principles, however, are equally applicable to other forms of ratio detecting circuits and indeed, the circuit of FIG. 4 may itself be used for many other important applications. This circuit is stable with time and temperature and performs analog division in an extremely linear manner.

It is to be understood that the above-described arrangements are merely illustrative of the numerous and other varied arrangements which may constitute applications of the principles of the invention. Such other arrangements may readily be devised by those skilled in the art without departing from the spirit or scope of this invention.

What is claimed is:

1. A ratio detector comprising a semiconductor body comprising a first zone of one conductivity type separated from a second zone of opposite conductivity type by a junction, third and fourth zones of said one conductivity type separated from said first zone and from each other by said second zone, means for applying a first current between said first and second zones, means for applying a second current between said third and fourth zones, and means for detecting the output voltage between said third and fourth zones, said voltage being proportional to the ratio of said second and first currents.

2. The ratio detector according to claim 1 wherein said third and fourth zones comprise multifingered regions interdigitated with each other.

3. The ratio detector according to claim 1 further including means for subtracting from said output voltage a voltage proportional to said second current.

4. An analog divider comprising first and second signal sources corresponding to divisor and dividend, respectively, a dual-emitter transistor, means for applying signals from said first source between the collector and base of said transistors, means for applying signals from said second source between the two emitters of said transistor, and means for detecting a voltage proportional to the quotient between said two emitters.

5. The analog divider according to claim 4 further including means for detecting peak amplitudes in signals from one of said signal sources, and means for delaying the application of signals from the other of said signal sources.

6. A ratio detecting circuit comprising a first source of signals proportional to a divisor, means for detecting and sustaining peak magnitudes of signals from said first source, a high gain amplifier, means for connecting the collector-base path of a dual-emitter transistor in a feedback path around said amplifier, means for applying a signal proportional to said peak magnitude through an impedance to said amplifier delay means, a second source of signals, means for applying signals from said second source to said delay means, a transformer, means connecting the secondary winding of said transformer between the two emitters of said transistor, means connecting the output of said delay means to the primary winding of said transformer, and means for detecting differential voltages across said primary winding, said differential voltage being proportional to the ratio of signals from said first and second sources.

7. The combination according to claim 6 further including means for compensating for body impedance of said transistor comprising means for subtracting a voltage proportional to signals from said second source from said differential voltage.

8. An analog divider comprising a semiconductor body having a first region comprising semiconductor material of one conductvity type, a second region contiguous to said first region and comprising semiconductor material of the opposite conductivity type, third and fourth regions contiguous to said second region, separated thereby from said first region, and comprising semiconductor material of said one conductivity type, means for inducing a current flow between said first and second regions, means for causing a current flow between said third and fourth regions, and means for utilizing the voltage developed between said third and fourth regions.

References Cited

UNITED STATES PATENTS

| | | | |
|---|---|---|---|
| 2,910,634 | 10/1959 | Rutz. | |
| 3,152,250 | 10/1964 | Platzer | 235—196 X |
| 3,205,348 | 9/1965 | Kleinberg | 235—196 |
| 3,210,621 | 10/1965 | Strull. | |
| 3,230,398 | 1/1966 | Evans et al. | |
| 3,264,533 | 8/1966 | Wright. | |

MALCOLM A. MORRISON, *Primary Examiner.*

J. RUGGIERO, *Assistant Examiner.*